United States Patent
Sveinsson

(10) Patent No.: US 7,603,868 B2
(45) Date of Patent: Oct. 20, 2009

(54) METHOD AND APPARATUS FOR PRODUCING FLUID ICE

(75) Inventor: Sigurgeir Sveinsson, Reykjavik (IS)

(73) Assignee: Skaginn HF, Akranesi (IS)

( * ) Notice: Subject to any disclaimer, the term of this patent is extended or adjusted under 35 U.S.C. 154(b) by 226 days.

(21) Appl. No.: 11/709,899

(22) Filed: Oct. 27, 2006
(Under 37 CFR 1.47)

(65) Prior Publication Data

US 2008/0184714 A1   Aug. 7, 2008

Related U.S. Application Data

(63) Continuation of application No. 11/365,840, filed on Mar. 2, 2006, now abandoned, which is a continuation of application No. 11/153,397, filed on Jun. 16, 2005, now abandoned, which is a continuation of application No. 10/926,302, filed on Aug. 26, 2004, now abandoned, which is a continuation of application No. 10/472,848, filed as application No. PCT/IS02/00007 on Mar. 27, 2002, now abandoned.

(51) Int. Cl.
*F25C 1/00* (2006.01)

(52) U.S. Cl. ............................................. 62/76; 62/330
(58) Field of Classification Search ................. 62/330, 62/66, 76, 340
See application file for complete search history.

(56) References Cited

U.S. PATENT DOCUMENTS

| | | | | | |
|---|---|---|---|---|---|
| 4,249,388 | A | * | 2/1981 | Burns | 62/185 |
| 4,401,449 | A | * | 8/1983 | Martin et al. | 62/59 |
| 4,912,935 | A | * | 4/1990 | Goldstein | 62/123 |
| 5,065,598 | A | * | 11/1991 | Kurisu et al. | 62/330 |
| 5,381,670 | A | * | 1/1995 | Tippmann et al. | 62/330 |
| 6,301,904 | B1 | * | 10/2001 | Goldstein | 62/64 |
| 6,460,789 | B2 | * | 10/2002 | Oh | 241/79.1 |
| 2005/0224100 | A1 | * | 10/2005 | Maunsell et al. | 134/56 D |

* cited by examiner

*Primary Examiner*—William E Tapolcai
(74) *Attorney, Agent, or Firm*—Finnegan, Henderson, Farabow, Garrett & Dunner, L.L.P.

(57) ABSTRACT

A method and an apparatus for producing a fluid ice are provided, wherein temperature and thickness of the fluid ice is independently controllable. The method and apparatus mixes ice together with at least two liquid phases, and stirs the mix. Stirring is maintained until a desired temperature and a desired grain size of the fluid ice is obtained.

16 Claims, 3 Drawing Sheets

METHOD AND APPARATUS FOR PRODUCING FLUID ICE

This is a continuation of application Ser. No. 11/365,840, filed Mar. 2, 2006 now abandoned, which is a continuation of application Ser. No. 11/153,397, filed Jun. 16, 2005 now abandoned, which is a continuation of application Ser. No. 10/926,302, filed Aug. 26, 2004 now abandoned, which is a continuation of application Ser. No. 10/472,848, filed Sep. 26, 2003 now abandoned, which is a National Stage of International Application No. PCT/IS02/00007 under 35 U.S.C. 371, filed Mar. 27, 2002, which is based on Iceland Application 5909, filed Mar. 27, 2001, all of which are incorporated herein by reference.

FIELD OF THE INVENTION

The present invention relates to a method and apparatus for producing fluid ice, wherein the temperature and the thickness of the fluid ice can be controlled.

DESCRIPTION OF THE PRIOR ART

It is well known that ice is highly useful for conserving the freshness of fresh food products such as fish and meat. Ice has for long time been produced with different kinds of ice making machines. The most common procedure is to freeze fresh water into ice cubes, which are transported to be used directly or to be stored.

Another type of ice is fluid ice, which is an essentially homogeneous mixture of water and fine grain ice. Fluid ice typically cools much faster than normal ice does, as it surrounds the product much better. Such type of ice is also easy to handle due to its fluidic properties and can easily be pumped with liquid pumps. Fluid ice is also easy to store and to transport; and further, the amount of fluid ice to be used or delivered can easily be controlled.

One way to produce fluid ice is to scrape ice crystals of a cooled surface as they are being formed. Such machines for producing fluid ice exist where salt water with a salinity from 2.5-3.5% is used. With this method the fluid ice is very fine and the grains very small. Such machines can however not produce fluid ice from water with 0% salinity. The salinity and the temperature of the incoming liquid must be correct and is usually controlled with special equipment.

Another way to produce fluid ice is by using a regular ice machine and to mix the ice with brine, wherein the ice is ground while it is mixed with the brine. In the method disclosed in WO 91/12475 a grinding wheel stirs and grinds the ice while the resulting fluid ice is pumped to the place of use.

A problem with these two methods is that the temperature of the fluid ice cannot be controlled. In the first-mentioned method the machines operate within a narrow range and are therefore unstable and sensitive in relation to the surroundings. In the latter method the thickness and the roughness of the fluid ice cannot be controlled.

DESCRIPTION OF THE INVENTION

It is an object of the present invention to provide a method and apparatus for producing fluid ice, where the temperature, the thickness and the grain size of the fluid ice can be controlled and held stable.

According to a first aspect, the present invention comprises a method for producing a fluid ice, wherein the temperature, the thickness (weight ratio of ice to total weight) and the ice grain size is controlled, the method comprising:

a mixing ice together with at least two liquid phases in suitable amounts, and stirring the mix together to finely grind the ice, wherein the stirring is maintained until a desired grain size is obtained and the desired temperature of the fluid ice is stable.

Suitable amounts of said at least two phases and of the ice are determined based on the salinity and temperature of the liquid phases, to obtain fluid ice with desired thickness and temperature.

In a useful embodiment, the number of liquid phases for producing the fluid ice is two, wherein one of said liquid phases can be pure water and the other, or both phases are brine. By using two liquid phases with different salinity, the temperature of the fluid ice can be controlled by varying the salinity. If however only one liquid phase is used, the final temperature cannot be controlled. Thus it is highly useful to use more than one liquid phase.

As an example, when the method of the invention is practiced onboard an ocean vessel, the supply of fresh water is limited, and in such cases sea water can be used as a first liquid phase while a second liquid phase is a brine with a different salinity, e.g. by mixing sea water with additional salt.

The number of liquid phases can also in other embodiments be more than two, such as e.g. three, wherein the third liquid phase may contain one or more compounds selected from the group containing flavorants, nutrients, antioxidants such as acetic acid, citric acid, vitamin C, BHT, TBHQ, etoxyquinin, anti-bacterial agents, other salts than sodium chloride such as phosphates, calcium salts, magnesium salts, potassium salts, sugars, other acids than the above, emulsifiers and gelling agents. These compounds can also be mixed to one of the at least two liquid phases.

It is a significant advantage that the thickness and temperature can be controlled independently, e.g. when conditions vary, such as ambient temperature and/or temperature of products to be frozen, it is useful to be able to produce fluid ice with a lower temperature, while maintaining a desired, suitable thickness.

The ice grain size of the fluid ice is determined through the stirring time. If the stirring time is increased the grain size of the fluid ice decreases and vice versa. Preferably the mixing of the liquid phases and the stirring time is controlled by a computer system, wherein the computer system registers e.g. the temperature of the fluid ice, the amount of liquid phases and ice and the salinity of the liquid phases.

In one embodiment, the procedure of making liquid phase is as stated below:

The liquid phases are introduced prior to the ice into a drum of suitable size for the batch size to be prepared. The salinity of the liquid phases are known (measured) and their amount is predetermined. Thereafter, the ice is mixed in with the liquid phases. The amount of each phase is calculated from the total amount of the fluid ice batch to be prepared, the measured temperature and salinity of the liquid phases, and the desired properties (ice thickness and temperature) of the batch to be prepared. As the ice loading into the combined liquid phases begins, a motor starts to stir and continues for a determined period of time after the ice loading is slopped. The drum can subsequently be emptied, and a new preparation produced.

According to a second aspect, the present invention comprises an apparatus for producing fluid ice comprising:

a drum supported by a supporting frame, an opening for introducing ice into the drum, at least one input channel connected to the drum for inflow of the at least two liquid phases, means to agitate the liquid and ice within the drum,
an output port for emptying the drum,
a nozzle connected to a pump for pumping the fluid ice out of the drum.

Preferably, the at least one input channel is provided with a salt meter, a valve and a flowmeter; and the at least one input channel may suitable comprise two or more input channels (e.g. pipes or hoses) for inflow of the at least two liquid phases. The drum is suitably provided with a thermometer for measuring the temperature of the fluid ice and a monometer for measuring the weight of the ice. Also the input channel(s) and output port are preferably provided with opening and closing valves. The mixing of ice and at least two liquid phases is controlled with a computer system, wherein the computer system is connected to the agitating means, the salt meters, the valves, the flowmeters and the thermometers. The agitating means may comprise e.g. a rotatable knife wheel positioned in the bottom of the drum for stirring the ice and the at least the two liquid phases, wherein the rotatable knife wheel is fastened on a vertical axis extending through the bottom of the drum

DETAILED DESCRIPTION

A preferred embodiment of the invention will now be described in detail with reference to the drawings, in which.

Figure 1:
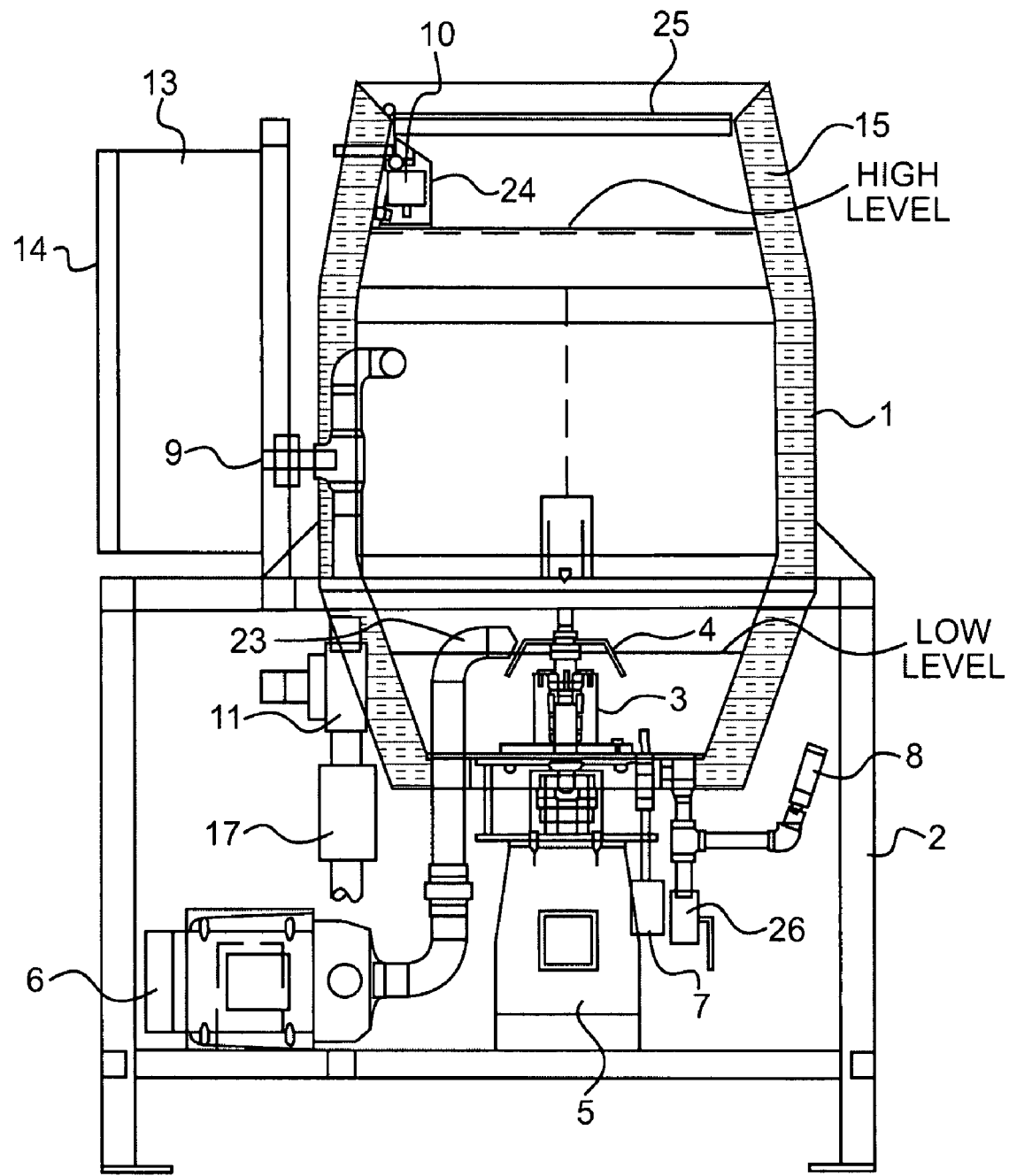
FIG. 1 shows a front view of an apparatus for producing fluid ice.
Figure 2:
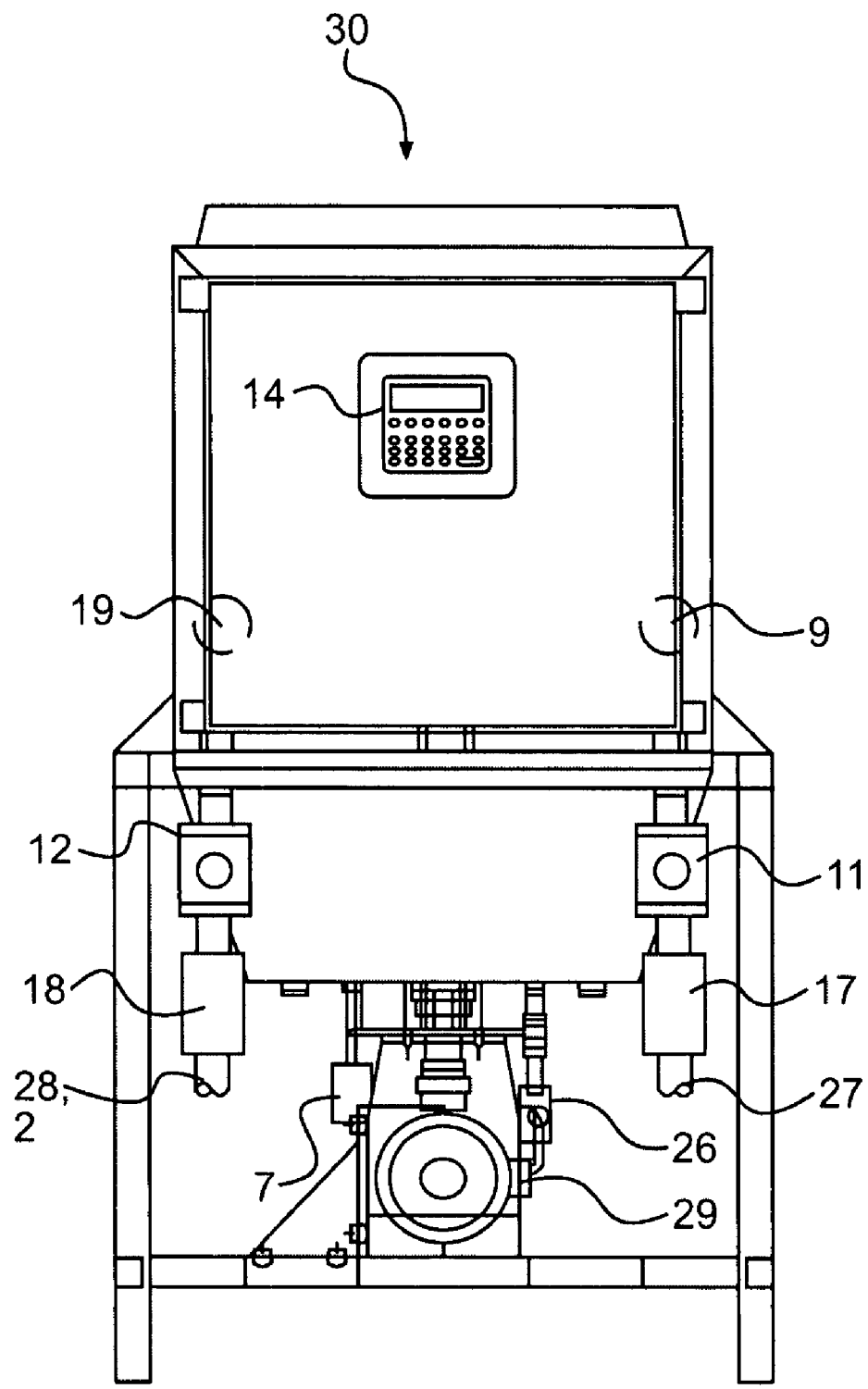
FIG. 2 shows a sectional view of an apparatus for producing fluid ice.

FIGS. 1 and 2 show the front and sectional side view of one embodiment of an apparatus for producing fluid ice comprising a drum 1 isolated from the surroundings 15. The drum 1 is supported by a supporting frame 2. On the top of the drum is an opening 30 for the ice and below the opening is a safety grid 25 for preventing too large ice chunks from entering the drum. Under the grid is a float switch 10 protected by a shield 24 positioned above the switch. This is to prevent the ice to damage the float switch when entering the drum. A vertical shaft 3 connects trough the bottom of the drum a motor 5 with a rotatable knife wheel 4 positioned in the bottom of the drum. The knife wheel as shown has four blades which point alternating up and down at an angle.

In this embodiment the apparatus is provided with two input channels 27, 28 connected to the drum for inflow of the two liquid phases. The first liquid phase enters channel 27 flows through a first salt meter 17 then through a first valve 11, which can be a magnetic valve and finally through a flowmeter 9, the second liquid phase channel 28 has a salt meter 18, a valve 12 and a flowmeter 19. A pump 6 is fastened to the supporting frame 2 under the drum 1 for emptying the drum. The fluid ice is emptied from the drum 1 through a conically shaped nozzle 23 connected to the pump 6 which delivers the ready made fluid ice through an ice outlet 29. The knife wheel rotates close to the nozzle 23 and prevents too large ice pieces from entering the nozzle and blocking the pump 6.

The drum 1 is provided with a thermometer 7 positioned within the drum in the bottom for measured temperature of the fluid ice. Also positioned at the bottom of the drum is a manometer 8 for measuring the height of the liquid ice column and thereby the amount of liquid ice at that instant. Preferably the manometer 8 is arranged such that liquid does not enter the meter. A valve 26 for draining the drum 1 is positioned on the same leg as the manometer 8, which also prevents bacteria from forming in leftover water.

Figure 3:
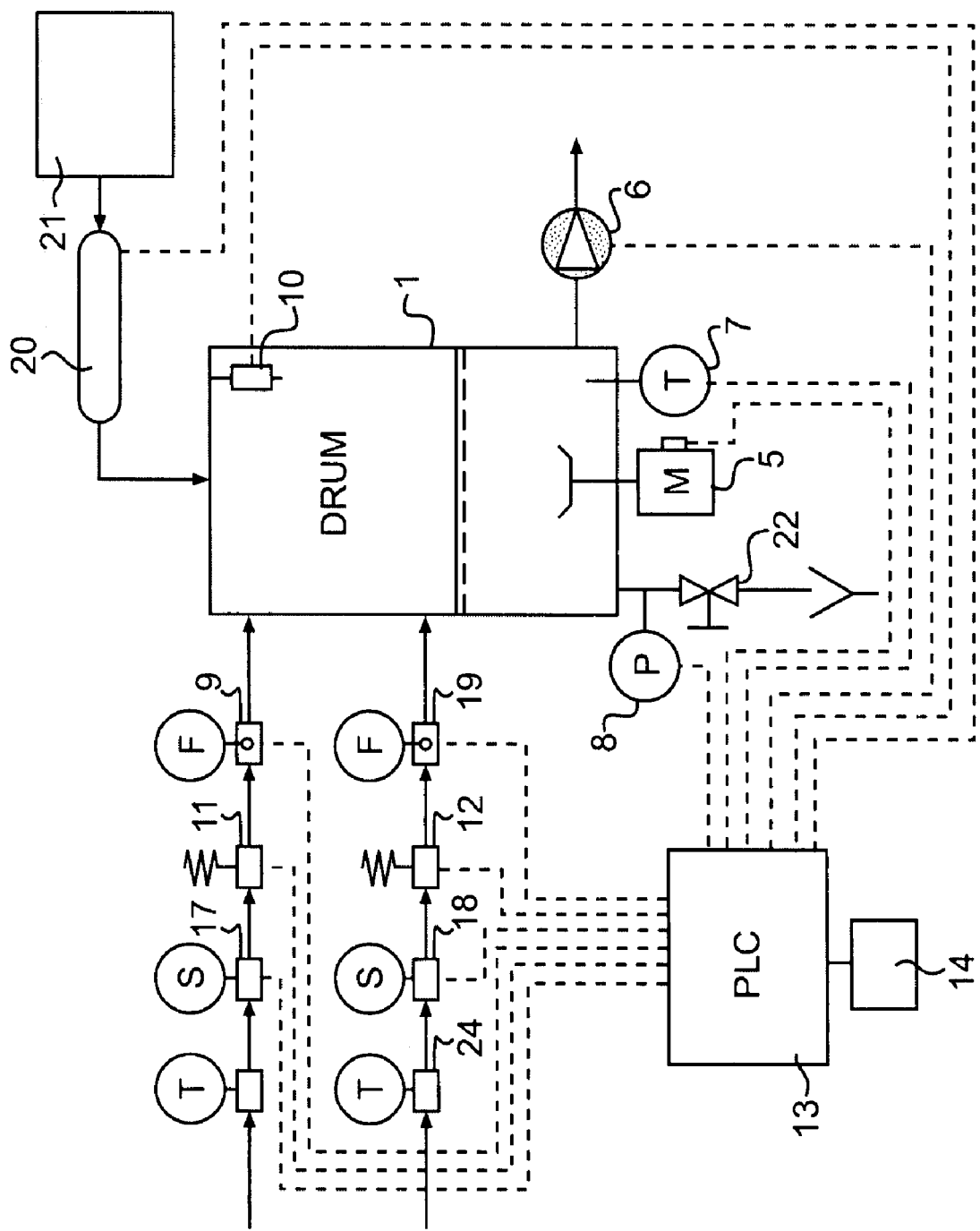
FIG. 3 shows a schematic overview of an apparatus and computer system for producing fluid ice.

The production process is preferably controlled by a PLC computer positioned in a control unit 13 and having a control keyboard 14 as shown in FIGS. 2 and 3. A computer display shows all the main information regarding the fluid ice, such as the temperature. If the temperature or the thickness of the liquid ice is to be changed new desired values can be entered through the control keyboard 14. The selected values are sent to the PLC computer 13 which is connected to the motor 5, the pump, thermometers, manometer, flowmeters, floating switch, valves, salt meters and conveying means 20 which transports ice to the drum from an ice storage (21).

The production process of the liquid ice is preferably such that the liquid phases are introduced into the drum 1 prior to the ice in a predetermined amount. When all the liquid that is to be used in the first batch is in the drum the ice is loaded into the drum. This may be done automatically with delivery means 20 (e.g. a conveyor or worm) connected to the computer system controlling the production process. The motor 5 starts to rotate as ice loading starts. When the ice loading is completed the drift motor 5 is kept running for a predetermined time, depending on the desired ice grain size of the fluid ice. This time can be based on calculations or simply based on prior operational experience. When the fluid ice is ready for use it is pumped to a storage vessel or directly to the site of use.

A mathematical model is used to control the production process, which is mainly based on the following parameters: the rotational energy of the motor 5, heat exchange to the surroundings, the temperature of the liquid phases, the salinity of the liquid phases and the temperature and the ratio of ice in the fluid ice. The model serves as basis for a computer program loaded on a PLC computer fed with data from the salt meters, the flowmeters, and the keyboard, and controls thereby the valves, pumps and motor. The model allows for influence of salinity to the specific gravity and the heat capacity.

It is well known that the freezing point of water is lowered below 0° C. by adding and dissolving salt in the water. The freezing point of brine can accordingly reach −21° C., at which point the salinity is 23.3% wt.

The thickness of the liquid ice and the temperature can be controlled by varying the above-mentioned parameters and gives the suitable amount of the liquid phases, respectively, and the amount of ice and the stirring time. Preferably, the liquid phases and the ice are introduced consecutively. This is done by measuring the liquid phases with a flowmeter and weighing the ice with a manometer preferably positioned in the bottom of the drum. The ice floats in the liquid and thereby it can be weighed. As mentioned before, the liquid phases are introduced into the drum prior to the ice. This ensures that the ice content is measured correct.

Mathematical Model:

The following example describes a mathematical model used in a preferred embodiment of the present invention.

A number of variables are used in the model having the following definitions:

| | |
|---|---|
| $m_t$, kg: | Total weight of one preparation |
| $m_w$, kg: | Weight of a brine w |
| $m_p$, kg: | Weight of brine p |
| $m_i$, kg: | Weight of ice put in the preparation |
| $V_t$, L: | Total volume of one preparation |
| $V_w$, L: | Volume of brine w |
| $V_p$, L: | Volume of brine p |
| $V_i$, L: | Volume of ice (net volume, no porosity) |

-continued

| | |
|---|---|
| $\Delta m_i$, kg: | Weight of melted ice after mixing it into the liquid phases |
| $T_t$, °C.: | Theoretical temperature of the liquid ice |
| $T_{p0}$, °C.: | Temperature of brine p by inflow |
| $T_{w0}$, °C.: | Temperature of brine w by inflow |
| $T_{i0}$, °C.: | Temperature of ice by inflow |
| $\Delta h_w$, kJ/kg: | Heat energy change of brine w |
| $\Delta h_p$, kJ/kg: | Heat energy change of brine p |
| $\Delta h_{iw}$, kJ/kg: | Heat energy change of molten ice |
| $\Delta h_{is}$, kJ/kg: | Heat energy change of ice (supercooled) |
| $C_p$, kJ/kg °C.: | Heat capacity of brine (as a function of salinity, x) |
| $C_{pi}$, kJ/kg °C.: | Heat capacity of ice, constant, (supercooled) |
| $x_w$, -*: | Solved salt as a ratio of weight of brine w |
| $x_p$, -*: | Solved salt as a ratio of weight of brine p |
| $x_t$, -*: | Solved salt as a ratio of weight of brine t |
| $x_i$, -*: | Solved salt as a ratio of weight of ice |
| r, -*: | Weight ratio of ice after mixing |
| e, -*: | Relative burden of stirring motor |

(*"-" indicates that the variable is without a unit and has a value between 0-1. On a computer screen the user selects these numbers as a percentage)

(*"-" indicates that the variable is without a unit and has a value between 0-1. On a computer screen the user selects these numbers as a percentage)

| | |
|---|---|
| $Q_a$, kJ: | Heat energy from the surrounding |
| $Q_m$, kJ: | Heat energy from the stirring motor |
| $h_L$, kg/kJ: | Latent heat of fusion of ice, kJ/kg: |
| $E_0$, kW: | The power of the stirring motor |
| $t_c$, sek: | Stirring time |
| k, °C.$^{-1}$: | Linear constant |

Assumption for the Model Calculations:
1. The ice is salt or pure and has 0° C. temperature or lower (supercooled)
2. No heat comes from the surroundings (the atmosphere)
3. The mixing can be from two phases (brine and ice) or three phases (brine 1, brine 2 and ice)
4. When three phases are used it is assumed that the desired temperature is given and thereafter the computer calculates the amount of each phase to reach the desired temperature (the measured temperature will never be exactly the same as desired temperature and the calculated temperature)
5. When two phases are used the computer calculates the temperature based on the assumption for the temperature of the liquid ice and the chosen ice ratio in slush (after stirring).
6. The melting of ice because of the kinetic energy of the motor will be assumed.

Heat capacity depends on the salinity, i.e. $C_p=C_p(x)$, where x is the salt ratio of the weight, which is given by the following equation:

$$C_p(x) = 4.1938 - 5.7x + 8x^2;\ 0 \leq x \leq 0.263 \tag{1}$$

According to Eq. (1) the heat capacity of a brine is lowered as it gets stronger ($C_p(0)=4.1938$, $C_p(0.263)=3.2481$).

The relation between a brine and salt content as a mass ratio is calculated as $$X_t = (-28.64 + (3842.93 - (T_t + 54.97)^2)^{1/2})/100, \tag{2}$$

Where $-21.1°$ C. $< T_t \leq 0°$ C. and $0 < x_t < 1$.

The heat energy change are approached as:

$$\Delta h_w = C_p(x_w)(T_{w0} - T_t) \tag{3}$$

$$\Delta h_p = C_p(x_p)(T_{p0} - T_t) \tag{4}$$

$$\Delta h_{iw} = C_p(0)(0 - T_t) \tag{5}$$

$$\Delta h_{is} = C_{pi}(0 - T_{i0}) \tag{5b}$$

Model for Three Phase Mixing

The energy balance for three phase mixing is given by $$\Delta m_i h_L + m_i h_{is} = m_w \Delta h_w + m_p \Delta h_p + \Delta m_i h_{iw} + Q, \tag{6}$$

where the parameters are given above.

The ice ratio after mixing can be formulated as $$r = (m_i - \Delta m_i)/m_t. \tag{7}$$

The salt weight balance can be written as $$x_t(m_w + m_p + \Delta m_i) = x_w m_w + x_p m_p + x_i m_i, \tag{8}$$

and the weight balance as $$m_t = m_w + m_p + m_i. \tag{9}$$

Equations (6)-(9) have four unknown variables, $m_w$, $m_p$, $m_i$ and $+\Delta m_i$. Solving these Eqs. it follows:

$$m_w = f_1/f_2 \tag{10}$$

where as stated before $m_w$ is the weight the inflow of brine w, $$m_p = (m_i g - m_w d)/b \tag{11}$$

is the weight of the inflow of brine p, and $$m_i = m_t - m_w - m_p \tag{12}$$

is the inflow weight of ice.

Equations (i)-(ix) here below are valid with the Eqs. (1)-(5b) as a basis for the equations (10)-(12):

$$f_1 = m_t(gf_3 - (aH - \Delta h_{is})) - Q \tag{i}$$

$$f_2 = (\Delta h_{is} + \Delta h_w - H) + f_3 d \tag{ii}$$

$$f_3 = c/b \tag{iii}$$

$$a = 1 - r \tag{iv}$$

$$b = x_p - x_i \tag{v}$$

$$c = H - \Delta h_{is} - \Delta h_p \tag{vi}$$

$$d = x_w - x_i \tag{vii}$$

$$g = x_t a - x_i \tag{iix}$$

$$H = \Delta h_{iw} - h_L. \tag{ix}$$

Clearly $x_p - x_i \neq 0$ which is the case when salinity of ice is the same as the salinity of brine p.

The mass density of brine as a function of salinity is calculated as $$\rho(x) = 1 + 0.772x. \tag{13}$$

It follows that the volume for brine w and brine p is given by $$V_w = m_p/\rho(x_w) \tag{14}$$

and $$V_p = m_p/\rho(x_p). \tag{15}$$

These values are measured with flowmeters.

To calculate three phase mixing according to Eqs. (11)-(13), wherein salinity is allowed in all phases and ice can be supercooled, the following values must be known:

Constants:

| | |
|---|---|
| $C_{pi}$, kJ/kg °C.: | 2,09. |
| $Q_a$, kJ: | 0. |
| $h_L$, kg/kJ: | 335. |
| $E_o$, kW: | 4 or 11. |

Measured Values:

$T_{po}$, ° C., $T_{wo}$, ° C., $T_{io}$, ° C., $x_w$, –, $x_p$, – and $x_i$, –.

Values that the User Can Select:

$T_f$, ° C.

$r$, –, $t_c$, s, and $e$, –.

Model for Two Phase Mixing

When the two phase mixing is used the temperature can no be selected when the ice ratio has been chosen, wherein the temperature of the liquid ice depend on the ice ratio. The lower the ice ratio is the lower the temperature of the liquid ice will be.

For two phase mixing the energy balance is given by:

$$\Delta m_i h_L + m_i h_{is} = m_w \Delta h_w + \Delta m_i h_{iw} + Q. \quad (6b)$$

The ice ratio after mining is $$r = (m_i - \Delta m_i)/m_t, \quad (7b)$$

the salt weight balance is $$x_t(m_w + \Delta m_i) = x_w m_w + x_i m_i, \quad (8b)$$

and the weight balance is given by $$m_t = m_w + m_i. \quad (9b)$$

By solving Eqs. (6b)-(9b) and Eq. (2) one obtains $$m_t g/b + (m_t(aH - \Delta h_{is}) + Q)/(\Delta h_{is} + \Delta h_w - H) = F(T_t). \quad (14)$$

$T_f$ can be solved from the condition $F(T_f)=0$ and therewith $x_t$ according to Eq. (2) and then $m_w$ according to Eq. (11), wherein the index w comes instead of p. This model is valid for both phases although the index w is used.

Equation (14) is used for calculating the interval for $T_t$ in a three-phase system. Initially the lowest possible temperature is calculated for the stronger brine (p), and the highest possible temperature for the weaker brine (w) by solving Eq. (14).

Equation (14) can easily be solved by iteration, such as by using the bisection method. It has the advantage that the derivative of the function $F(T_t)$ does not have to be known and is also convergence if the interval for $T_t$ is known, which is the case here ($-21.1 < T_t < 0$). The method is on the other hand relative slow. On the other hand where the calculations need not to be repeated for each change in the assumption. If the thermometers and the salt meters are connected to the computer then the calculations are updated for each preparation.

The following examples show results obtained from a mathematical model as described above for determining suitable amounts of liquid phases and ice for producing fluid ice with desired properties. The examples show two fluid ice batches with the same thickness but different temperature.

EXAMPLE 1

| | |
|---|---|
| Salt mass ratio of brine 1 | 3.5% |
| Salt mass ratio of brine 2 | 0% |
| Salt mass ratio of ice | 0% |
| Temperature of brine 1 | 35% |
| Temperature of brine 2 | 25% |
| Temperature of ice | 0% |
| Mixing time | 120 s |
| Batch mass | 100 kg |
| Ice ratio of fluid ice | 35% |
| Temperature of fluid ice | −1.301° C. |
| Fluid ice salinity | 3.564% |
| Mass of sodium chloride | 1.55 kg |
| Volume of brine 1 | 43.246 L |
| Volume of brine 2 | 0 L |
| Mass of ice | 55.703 kg |

EXAMPLE 2

| | |
|---|---|
| Salt mass ratio of brine 1 | 0% |
| Salt mass ratio of brine 2 | 26.3% |
| Salt mass ratio of ice | 0% |
| Temperature of brine 1 | 10° C. |
| Temperature of brine 2 | 25° C. |
| Temperature of ice | 0° C. |
| Mixing time | 120 s |
| Batch mass | 100 kg |
| Ice ratio of fluid ice | 35% |
| Temperature of fluid ice | −2° C. |
| Fluid ice salinity | 3.564% |
| Mass of sodium chloride | 2.317 kg |
| Volume of brine 1 | 45.758 L |
| Volume of brine 2 | 7.328 L |
| Mass of ice | 45.570 kg. |

The invention claimed is:

1. A method for batch production of fluid ice, comprising: measuring a salinity of at least two liquid phases; mixing ice together with the at least two liquid phases; and stirring the mix together to finely grind the ice, wherein suitable amounts of said at least two liquid phases and ice are determined based on the salinity and a temperature of the at least two liquid phases to thereby independently control a thickness and a temperature of the fluid ice, and wherein the stirring is maintained until a desired grain size is obtained and a desired temperature of the fluid ice is stable.

2. The method according to claim 1, wherein the salinity of the at least two liquid phases is dissimilar.

3. The method according to claim 1, wherein the at least two liquid phases are introduced prior to the ice.

4. The method according to claim 3, wherein the ice is introduced in portions.

5. The method according to claim 1, wherein at least one of the at least two liquid phases comprises at least one compound chosen from flavorants, nutrients, antioxidants, antibacterial agents, salts other than sodium chloride sugars, acids, emulsifiers and gelling agents.

6. The method according to claim 1, wherein the mixing of the ice and the at least two liquid phases is controlled by a computer.

7. An apparatus for producing a fluid ice, comprising:
a drum supported by a supporting frame;
an opening for introducing ice into the drum;
at least one input channel connected to the drum for inflow of at least two liquid phases;
agitating means for agitating the liquid and the ice within the drum;
an output port for emptying the drum; and
a nozzle connected to a pump for pumping the fluid ice out of the drum,
wherein the at least one input channel is provided with a salt meter, a valve and a flowmeter; and
wherein the apparatus is adapted such that a temperature and a thickness of batch-produced fluid ice can be independently controlled by determining suitable amounts of said at least two liquid phases and the ice based on a salinity and a temperature of the at least two liquid phases and thereby independently controlling the thickness and the temperature of the fluid ice.

8. The apparatus according to claim 7, comprising at least two input channels for inflow of the at least two liquid phases.

9. The apparatus according to claim 7, wherein the drum is provided with a thermometer for measuring the temperature of the fluid ice.

10. The apparatus of claim 7, wherein the agitating means comprises a rotatable knife wheel positioned in the bottom of the drum for stirring the ice and the at least two liquid phases, wherein the rotatable knife wheel is fastened on a vertical shaft extending through the bottom of the drum.

11. The apparatus according to claim 7, wherein the mixing of ice and the at least two liquid phases is controlled with a computer system, wherein the computer system is connected to the agitating means, the salt meters, the valves, the flowmeters and the thermometers.

12. The method according to claim 5, wherein the antioxidants are chosen from acetic acid, citric acid, vitamin C, BHT, TBHQ, and etoxyquinin.

13. The method according to claim 5, wherein the salts other than sodium chloride are chosen from phosphates, calcium salts, magnesium salts, and potassium salts.

14. An apparatus for producing a fluid ice, comprising:
a drum supported by a supporting frame;
an opening for introducing ice into the drum;
at least one input channel connected to the drum for inflow of at least two liquid phases;
an agitator to agitate the at least two liquid phases and the ice within the drum;
an output port for emptying the drum; and
a nozzle connected to a pump for pumping the fluid ice out of the drum
wherein the at least one input channel is provided with a salt meter, a valve and a flowmeter; and
wherein the apparatus is adapted such that a temperature and a thickness of batch-produced fluid ice can be independently controlled by determining suitable amounts of said at least two liquid phases and the ice based on a salinity and a temperature of the liquid phases and thereby independently controlling the thickness and the temperature of the fluid ice.

15. The apparatus of claim 14, wherein the agitator comprises a rotatable knife wheel positioned in the bottom of the drum for stirring the ice and the at least two liquid phases, wherein the rotatable knife wheel is fastened on a vertical shaft extending through the bottom of the drum.

16. A drum for producing a fluid ices comprising:
an opening for introducing ice into the drum;
at least one input channel connected to the drum for inflow of at least two liquid phases;
an agitator to agitate the at least two liquid phases and the ice within the drum;
an output port for emptying the drum; and
a nozzle
wherein the at least one input channel is provided with a salt meter, a valve and a flowmeter.

* * * * *